United States Patent Office 2,962,463
Patented Nov. 29, 1960

2,962,463
COMPOSITION COMPRISING STYRENE-ACRYLO-
NITRILE COPOLYMER, PLASTICIZER AND
WAX AND METHOD OF PREPARING SAME

Vernon W. Schroeder and Carlo F. Martino, Somerville, N.J., assignors to Union Carbide Corporation, a corporation of New York No Drawing. Filed July 14, 1958, Ser. No. 748,161

10 Claims. (Cl. 260—28.5)

The present invention relates generally to modified styrene-acrylonitrile resins and more particularly, to styrene-acrylonitrile copolymers in combination with a plasticizer and a modifying wax.

Prior to the present invention a considerable and increasing need had arisen in the plastics field for a tough, inexpensive, and chemically resistant plastic material which could readily be formed into such articles as phonograph or sound records, typewriter parts, radio cabinets, and the like by commercial molding techniques. This need could not be fulfilled by prior existing compositions for a variety of reasons including insufficient toughness, lack of the required heat stability to withstand injection molding, or too high in cost.

Attempts have been made prior to the present invention to utilize styrene-acrylonitrile compounds for making articles of manufacture such as stated above. Compositions of different styrene-acrylonitrile copolymers both with and without plasticizers have been investigated and evaluated for such uses. Although most compositions tested showed certain advantages with respect to cost, chemical resistance, etc., over polystyrene or polyvinyl plastics, none have been discovered which meet the high strength requirements.

It is therefore a general object of the present invention to overcome the inadequacies of prior art styrene-acrylonitrile compositions where their uses require a high degree of toughness.

It is a more particular object to provide a styrene-acrylonitrile copolymerized resin material which has been modified with both a plasticizer and a wax constituent to enable it to be injection or compression molded and still possess superior strength properties compared with conventional styrene-acrylonitrile copolymer articles of manufacture.

It is a still more particular object to provide a superior plastic composition for making sound records, radio cabinets, telephone handsets, and the like.

Other objects and a fuller understanding of the invention may be had by referring to the following description, examples, and claims.

These objects are accomplished by modifying a styrene-acrylonitrile copolymer containing from about 5 to 50 percent acrylonitrile by weight with from about 0.25 to 5.0 percent by weight, based on the resin weight of a wax modifier and with from about 1.0 to 10.0 percent by weight based on the resin weight, of a suitable plasticizer.

Suitable plasticizers for the purpose of the present invention include those compounds which may be represented by the general formula $R(COOR')_n$ wherein $n$ has a value of 1 to 2; $R'$ is a monovalent, saturated hydrocarbon radical containing from 4 to 10 carbon atoms such as butyl, octyl, iso-octyl, cyclohexyl, and the like; R (when $n=1$) is an alkyl group containing from 11 to 17 carbon atoms such as the alkyl residue of fatty acids ranging from lauric to stearic; and R (when $n=2$) is a divalent, saturated, aliphatic hydrocarbon radical containing from 4 to 8 carbon atoms, such as the hydrocarbon residues of dibasic acids such as adipic, sebacic, and the like.

The preferred plasticizers are those wherein $n=1$, $R'=$cyclohexyl, and R is a straight chain alkyl group containing an odd number of carbon atoms, as for instance, cyclohexyl laurate, cyclohexyl myristate, cyclohexyl palmitate, and cyclohexyl stearate, and mixtures thereof. These preferred plasticizers, which have the general formula $C_{2m-1} H_{4m-1} COOR''$ wherein $m$ has a value of 6 to 9 and $R''$ is cyclohexyl, provide a superior combination of plasticizer non-volatility and thermal stability and end-product properties, which makes them especially useful for compounding at elevated temperatures in high shear equipment. Under such conditions these plasticizers do not suffer undue thermal decomposition or volatile loss.

Particularly preferred are those compounds wherein $m$ has a value of from 6 to 8, i.e., cyclohexyl laurate, myristate and palmitate, and mixtures thereof. Said plasticizers are most readily incorporated into the copolymer composition, are most compatible with the resin, and least prone to "blush-out" or "smear" onto the surfaces of formed articles.

The waxes found suitable for the present invention include natural waxes such as carnauba, candelilla, montan, esparto, ouricury, beeswax, cotton wax, insect or chinese wax, and the like which are generally identified as ester-type waxes and consist of mixtures of esters of higher monohydric alcohols and higher fatty acids, free acids and alcohols, and long chain aliphatic hydrocarbons. Additionally, waxes which are essentially glycerol esters of higher fatty acids such as Japan wax and myrtle wax; the synthetic waxes obtained by hydrogenation of vegetable, marine and animal oils such as castor oil, whale oil, and mossbunker oil; the unsaponifiable hydrocarbon mineral waxes such as paraffin waxes, microcrystalline waxes, ozokerite and the like; and synthetic high molecular weight waxes, such as the Fischer-Tropsch waxes (made from carbon monoxide and hydrogen) have also been found to be suitable.

The styrene-acrylonitrile copolymers found to be suitable encompass those containing from about 5 to 50 percent acrylonitrile by weight and complementarily 95 to 50 percent styrene by weight. Preferably, however, the copolymer contains from about 20 to 35 percent acrylonitrile by weight with the most preferred copolymer containing from 27 to 29 percent acrylonitrile by weight and complementarily 73 to 71 percent styrene. The preferred average molecular weight range is from about 180,000 to 300,000 as calculated from a specific viscosity over concentration value between about 0.7 and 1.0 as determined from viscosity measurements made at 25° C. of an 0.2 percent by weight solution of the copolymer in methyl ethyl ketone.

Satisfactory plasticizer content of the compositions of the present invention have been found to be in the range of from 1 to 10 percent by weight based on the weight of the copolymer. The preferable plasticizer content range is from about 3 to 7 percent by weight based on the weight of copolymer.

Similarly, the broad range of wax content found to be satisfactory has been found to be from 0.25 percent to 5.0 percent, but the best results are obtained when the wax content is limited to the range of 0.5 to 3.0 percent by weight based on the weight of copolymer.

data were obtained were cut from an injection molded plaque in the direction indicated.

TABLE I

|  | Unmodified Styrene-Acrylonitrile Copolymer (RMD-4511), Avg. | RMD-4511 plus 5 parts[1] Cyclohexyl Palmitate | RMD-4511 plus 2.5 parts[1] Carnauba Wax, 4434-96C | RMD-4511 plus 5 parts[1] Cyclohexylpalmitate and 2.5 parts[1] Carnauba Wax, 4434-96C |
|---|---|---|---|---|
| Flexural Deflection at Break, n./2 n. span, ASTM D-790-49T: |  |  |  |  |
| In direction of flow | .29 | .32 | [2] .5 | [2] .5 |
| Across lines of flow | .11 | .12 | .1 | [2] .5 |
| Tensile Elongation at Break, percent ASTM D-638-52T: |  |  |  |  |
| In direction of flow | 3.10 | 2.9 | 3.3 | 20 |
| Across lines of flow | 1.8 | 1.8 | 2.2 | 26 |
| Charpy Impact Strength, ft. lbs./ n. width, ASTM D-256-47T: |  |  |  |  |
| In direction of flow | 4.6 | | 13.8 | 16.9 |
| Across lines of flow | 3.0 | 4.3 | 4.3 | 9.2 |
| Flexural Modulus of Elasticity, p.s.i., ASTM D-790-49T: |  |  |  |  |
| In direction of flow | 588,000 | 576,000 | 551,000 | 587,000 |
| Across lines of flow | 577,000 | 579,000 | 579,000 | 553,000 |
| Extrusion Plastometer, ASTM D-1238-52T, mg/min. at 100 p.s.i., 200° C | 35 | 100 | 95 | 160 |

[1] Per 100 parts resin (by weight).
[2] Machine maximum.

The styrene-acrylonitrile injection molding compositions of the present invention can be made by mixing together the resin and modifiers in a Banbury mixer at temperatures of at least 170° C. and preferably between 180° C. and 230° C. until a uniform dispersion is secured. Heated rolls can also be used, but periods of mixing of 45 minutes or more are required. Also, the modifiers may be injected into the resin or resin compounding equipment on a continuous production unit.

The compositions thus obtained are surprisingly superior to the copolymer modified with either a plasticizer or a wax alone. The use of the plasticizer alone in the styrene-acrylonitrile copolymer lowers elongation and flexibility values and the use of wax alone provides only a relatively small improvement in strength. The composition of copolymer, plasticizer, and wax, however, has substantially the same modulus as the unmodified copolymer and yet has greater elongation, will bend further before breaking, and has better practical toughness. The wax and the plasticizer reduce the viscosity of the styrene-acrylonitrile copolymer at molding temperatures and thus make it easier to mold.

A good indication of the qualities of toughness and resistance to breakage under normal use of such items as sound records, radio cabinets, telephone handsets, etc. is found in the tensile elongation at break. This term may be defined as the increase in length of a section of plastic under test expressed as a percentage difference between the original length and the length at the moment of rupture. In the examples following tests of the Tensile Elongation of a given composition were carried out according to the specifications of ASTM D-638-52T. Other comparisons are made using data obtained from tests to determine the Flexural Deflection at Break, ASTM D-790-49T; Charpy Impact Strength, ASTM D-256-47T; Flexural Modulus of Elasticity, ASTM D-790-49T; and Extrusion Plastometer, ASTM D-1238-52T.

The unexpectedly improved compositions of the present invention may be shown to be the synergistic effect of the two essential kinds of modifiers as herein disclosed. While the exact nature of the interaction between the copolymer, the plasticizer, and the wax constituents is not fully known, the result can be demonstrated by use of the tests described above. The following table contains test data on a typical styrene-acrylonitrile copolymer (Bakelite RMD-4511, containing approximately 28 percent by weight acrylonitrile and having a reduced viscosity of 0.85 to 1.0) and three modified compositions. The specimens from which these It may be seen from this table that tensile elongation at the point of rupture is actually decreased for a composition containing only a copolymer and a plasticizer compared with the copolymer alone. Modification of the same copolymer with wax alone produces only a relatively minor improvement in tensile elongation. The combination of plasticizer and wax on the other hand, improves the tensile elongation at break about 700 percent. It may also be observed that the effect of the two modifiers used in combination is more than could be expected from a mere additive effect of the contribution of either modifier used alone. The net result of adding both a fatty acid ester plasticizer and a wax, furthermore, leaves the flexural modulus of elasticity substantially unimpaired.

The following examples are intended to more clearly define the invention and are not intended to limit in any manner the compositions either as to their content or to the method of producing them.

Example I

A styrene-acrylonitrile copolymer having a molecular weight of 240,000 and having a reduced viscosity of 0.9 (0.2 gms./100 ml. solution in methyl ethyl ketone at 25° C.) was mixed with the following modifiers and additives in the following proportions to form three compositions typical of those coming within the scope of the present invention:

| Composition | 1-A | 1-B | 1-C |
|---|---|---|---|
| Plasticizer (cyclohexylpalmitate)* | 5.00 | 5.00 | 5.00 |
| Wax (carnauba)* | 0.50 | 1.50 | 2.50 |
| Antioxidant (dibutyl-p-cresol)* | 0.25 | 0.25 | 0.25 |
| Wetting Agent (Emulphor ON-870 [1])* | 0.25 | 0.25 | 0.25 |
| Copolymer | 100 | 100 | 100 |

*Modifiers and additives—parts by weight per 100 parts copolymer.
[1] Antara products.

The ingredients were charged into a hot Banbury mixer (180 p.s.i.g. steam pressure on rotors and jacket) in such a manner as to sandwich the modifiers and additives between two layers of copolymer. The ingredients were mixed for a total of 20 minutes bringing the discharge temperature of the material up to 200 to 210° C. The mixed material was then milled for 5 minutes on a two-roll mill while maintaining the temperature of the rolls at 165° C. After the milling operation, the material was cooled, granulated to a ¼ inch maximum size and injection molded on a four ounce Reed Prentice press with a stock temperature of 250° C. and a mold temperature of 62° C. Data from physical tests on samples of these three compositions appear immediately below:

| Compound | ASTM D790-49T Flexural Deflection at Break, inches | | ASTM D256-47T Charpy Impact, ft./lbs./in. width | | ASTM D638-52T Tensile Elongation (percent) |
|---|---|---|---|---|---|
| | ¼″ bar | ⅛″ bar | Machine Direction | Tranverse Direction | |
| RMD-4511—Styrene Acrylonitrile Copolymer. | 0.409 | 0.288 | 4.55 | 3.01 | 1.78 |
| 1-A | .088 | no break | 9.89 | 4.29 | 8.0 |
| 1-B | 0.88 | | | 5.65 | 12.0 |
| 1-C | 1.53 | no break | 16.9 | 9.16 | 20.0 |

All samples containing both the plasticizer and the wax showed marked improvement in all properties tested over the unmodified copolymer. Generally, properties improved with increasing wax content, particularly, the tensile elongation at break being outstanding.

*Example II*

A styrene-acrylonitrile copolymer having the same characteristics as Example I was homogeneously mixed with the following modifiers and additives in the following parts by weight.

| Composition | 2-A | 2-B | 2-C | 2-D |
|---|---|---|---|---|
| Copolymer | 100.00 | 100.00 | 100.00 | 100.00 |
| Plasticizer (cyclohexylmyristate) | 5.00 | 5.00 | 5.00 | 5.00 |
| Wax (carnauba) | 0.25 | 0.50 | 1.00 | 1.50 |
| Antioxidant (dibutyl-p-cresol) | 0.25 | 0.25 | 0.25 | 0.25 |
| Wetting Agent (Emulphor ON-870[1]) | 0.25 | 0.25 | 0.25 | 0.25 |

[1] Antara products.

The ingredients were charged into a hot eight pound Banbury mixer (180 p.s.i.g. steam pressure on rotors and jacket) in such a manner as to sandwich the modifiers and additives between two layers of copolymer. The ingredients were mixed for a total of 8 to 10 minutes bringing the discharge temperature of the material up to 210° C. to 215° C. The mixed material was then milled for 5 minutes on a two roll mill while maintaining the temperature of the rolls at 170° C. After the milling operation, the material was cooled, granulated to a ¼ inch maximum size and injection molded on a four ounce Reed Prentice press with a stock temperature of 250° C. and a mold temperature of 62° C. Data from physical tests on samples of these four compositions appear below:

| Compound | ASTM D-790-49T Flexural Deflection at Break, inches | | ASTM D-256-47T Charpy Impact, ft. lbs./in. width | | ASTM D-638-52T Tensile Elongation (percent) |
|---|---|---|---|---|---|
| | ¼″ bar | ⅛″ bar | Machine Direction | Transverse Direction | |
| RMD-4511—Styrene Acrylonitrile Copolymer. | 0.409 | 0.288 | 4.55 | 3.01 | 1.78 |
| 2-A | 0.639 | 0.488 | 6.03 | 4.57 | 5 |
| 2-B | 0.79 | 0.419 | 5.55 | 4.45 | 9 |
| 2-C | 1.29 | no break | 6.26 | 4.04 | 16 |
| 2-D | 1.36 | no break | 6.63 | 4.34 | 17 |

From the data it is seen that cyclohexylmyristate produces similar improvements in conjunction with carnauba wax to those set forth in Example I.

*Example III*

Composition 1-C from Example I and compositions 2-A, 2-B, 2-C and 2-D from Example II were used to make ten inch microgroove-type sound records. Each composition was injection molded on a 12 ounce Lester injection press with the stock temperature maintained at 250° C. and the mold temperature at 75° C. to 80° C. The records showed improved resistance to breaking compared with a record molded from unmodified styrene-acrylonitrile copolymer, and possessed excellent initial sound quality and commercially acceptable wear properties after 100 plays using 10 gram weight pick-up and sapphire stylus. Increased surface dusting on the record after playing occurred as the wax content was decreased. Sound quality improved slightly with decrease in wax content.

*Example IV*

Two modified styrene-acrylonitrile compounds which contained the following constituents in the following parts by weight were prepared according to the method of Example II using the same temperature, pressure, and time operating conditions.

| Composition | 4-A | 4-B |
|---|---|---|
| Copolymer (Bakelite RMD-4511) | 100.00 | 100.00 |
| Plasticizer (cyclohexyllaurate) | 5.00 | 5.00 |
| Wax (Carnauba) | 0.25 | 1.5 |
| Antioxidant (dibutyl-p-cresol) | 0.25 | 0.25 |
| Wetting Agent (Emulphor ON-870) | 0.25 | 0.25 |

Data from physical tests on samples of these two compositions appear immediately below:

| Compound | ASTM D-790-49T Flexural Deflection at Break, inches | | ASTM D-256-47T Charpy Impact, ft. lbs./in. width | | ASTM D-638-52T Tensile Elongation (percent) |
|---|---|---|---|---|---|
| | ¼″ bar | ⅛″ bar | Machine Direction | Transverse Direction | |
| RMD-4511—Styrene Acrylonitrile Copolymer | 0.409 | 0.288 | 4.55 | 3.01 | 1.78 |
| 4-A | 0.592 | 0.434 | 5.44 | 4.64 | 3 |
| 4-B | 1.21 | 0.933 | 6.29 | 4.49 | 17 |

Microgroove sound records made from these compositions exhibited improved resistance to breakage and possessed excellent initial sound qualities. After 100 plays using a sapphire stylus and a 10 gram pick-up, the sound quality was still commercially acceptable.

*Example V*

Several samples of a styrene-acrylonitrile copolymer (Bakelite's RMD-4511) containing approximately 28 percent acrylonitrile by weight and having a reduced viscosity of 0.85 (0.2 gram per 100 ml. solution in methyl ethyl ketone at 25° C.) were modified with 2.5 parts per 100 parts copolymer of carnauba wax and various fatty acid ester plasticizers. The ingredients were charged into a hot eight pound Banbury mixer (175 lbs./in.$^2$ steam pressure on rotors and jacket) in such a manner as to sandwich the modifiers between two layers of resin. The compounds were mixed for a total time of 20 minutes at which time the material discharge temperature was 215° C. The material was then milled for 5 minutes on a two roll mill while maintaining the rolls at 165° C., cooled and granulated to a particle size of ¼ inch maximum. The particles were then externally lubricated and injection molded into tensile bars at a stock temperature of 250° C. and a mold temperature of 50° C. on a one ounce Van Dorn molding machine. The tensile properties of the modification and of the RMD-4511 formulations were compared. The physical property data are shown below:

| Copolymer | Wax | Plasticizer [1] | Tensile Elongation at Break, percent | Tensile Modulus, lbs./in.$^2$ |
|---|---|---|---|---|
| RMD-4511 | Carnauba | | 3.32 | 476,000 |
| RMD-4511 | do | butyl stearate | 21.0 | 522,000 |
| RMD-4511 | do | polyethylene glycol di-2-ethylhexanoate | 24.0 | 434,000 |
| RMD-4511 | do | cyclohexyl palmitate | 24.0 | 468,000 |

[1] Five parts per 100 parts by weight of copolymer.

The plasticizers employed were all considered operable in this invention because of their high elongation values as compared to unmodified RMD-4511 styrene-acrylonitrile.

*Example VI*

Thirteen RMD-4511 styrene-acrylonitrile copolymer modifications were prepared which contained 5 percent of cyclohexyl palmitate and 2.5 percent of waxes of various types and compared. The experiments showed that oxidized microcrystalline, microcrystalline, synthetic mineral and petroleum waxes were all suitable for use in the present invention.

The compounds were prepared in a Banbury mixer. The ingredients were charged to a hot 8 pound Banbury mixer (175 p.s.i.g. steam pressure on rotors and jacket) in such a manner that the modifiers were sandwiched between the resin. The compounds were mixed for a total of 20 minutes at which time the material discharge temperature was 215° C. The compounds were then milled on a two roll mill with roll temperatures being maintained at 165° C. After 5 minutes of milling the material was sheeted off the mill, cooled, and granulated to a maximum particle size of ¼ inch. The particles were then externally lubricated and injection molded into tensile bars at a stock temperature of 250° C. and mold temperature of 50° C. on a 1 ounce Van Dorn injection molding machine. The tensile properties of the modifications and of the RMD-4511 formulation containing the carnauba wax were compared to determine the effectiveness of the other waxes as substitutes for carnauba wax. The physical properties of the modifications are shown below.

| Waxes Employed | Tensile Strength, p.s.i. | Tensile Elong., percent | Tensile Modulus, p.s.i. |
|---|---|---|---|
| Carnauba | 5,830 | 24 | 468,000 |
| Microcrystalline—M.P. 195° F.; Penetration at 77° F./100 g./5 sec., 2 max. [1] | 5,860 | 25 | 474,000 |
| Microcrystalline—M.P. 170-175° F.; Penetration at 77° F./100 g./5 sec., 15-20 [1] | 5,400 | 22 | 499,000 |
| Microcrystalline—M.P. 190-220° F.; Penetration at 77° F./100 g./5 sec., 3-5 [1] | 5,000 | 17 | 445,000 |
| Oxidized microcrystalline—M.P. 195-200° F.; Penetration at 77° F./5 sec., 1-2 [1]; Saponification number 55-65 | 5,490 | 27 | 426,000 |
| Oxidized microcrystalline—M.P. 184-189° F.; Penetration at 77° F./100 g./5 sec., 4-6 [1]; Saponification number 45-55 | 6,340 | 25 | 476,000 |
| Oxidized microcrystalline—M.P. 180° F. min.; Penetration at 77° F./100 g./5 sec., 7 max. [1] | 5,910 | 32 | 463,000 |
| Oxidized microcrystalline—M.P. 180° F. min.; Penetration at 77° F./100 g./5 sec., 4-6 [1] | 5,990 | 32 | 471,000 |
| Synthetic high molecular weight aliphatic hydrocarbon wax [2]—M.P. 212-219° F.; Penetration at 77° F./100 g./5 sec., 3-5 [1]; Saponification number <0.5; Solidification temperature 194-202° F. | 5,550 | 22 | 564,000 |
| Synthetic high molecular weight aliphatic hydrocarbon wax [3]—M.P. 221-225° F.; Penetration at 77° F./100 g./5 sec., <1 [1]; Saponification number 0; Solidification temperature 205-212° F. | 5,410 | 20 | 449,000 |
| Synthetic straight chain hydrocarbon wax—M.P. 180° F.; Penetration at 77° F./100 g./5 sec., 1-3 [1]; Saponification number 75 | 5,410 | 23 | 437,000 |

[1] ASTM D1321-54T.
[2] Fischer Tropsch—300.
[3] Fischer Tropsch—200.

From the foregoing general description and detailed specific examples, it will be evident that this invention provides novel compositions having unique and excellent properties, particularly toughness, impact strength, and heat stability. The compositions may be formed by simple and inexpensive techniques into a wide variety of useful objects. The plasticizers and waxes employed are cheaply and abundantly available.

It is of course understood that the novel compositions hereindescribed may, in addition, comprise various additives such as pigments, antioxidants, wetting agents, and the like without departing from the scope of the present invention.

What is claimed is:

1. A modified thermoplastic resin composition comprising: (A) a styrene-acrylonitrile copolymer containing from about 5 to about 50 percent acrylonitrile by weight and complementarily 95 to 50 percent styrene by weight, (B) a plasticizer in an amount of about 1 to about 10 parts by weight per 100 parts by weight of said copolymer, said plasticizer having the general formula $R(COOR')_n$ wherein R' is a monovalent, saturated hydrocarbon radical containing from 4 to 10 carbon atoms and R is a member selected from the group consisting of an alkyl group containing from 11 to 17 carbon atoms, and a divalent, saturated aliphatic hydrocarbon radical containing from 4 to 8 carbon atoms with the provisos that when R is monovalent, $n$ is 1, and that when R is divalent, $n$ is 2, and (C) a homogeneously dispersed wax in an amount of about 0.25 to about 5 parts by weight per 100 parts by weight of said copolymer.

2. A modified thermoplastic resin composition comprising: (A) a styrene-acrylonitrile copolymer containing from about 5 to about 50 percent acrylonitrile by weight and complementarily 95 to 50 percent styrene by weight, (B) a plasticizer in an amount of about 1 to about 10 parts by weight per 100 by weight of said copolymer, said plasticizer having the general formula $$C_{2m-1}H_{4m-1}COOR''$$

wherein R'' is a cyclohexyl radical and m has a value of from 6 to 9, and (C) a homogeneously dispersed wax in an amount of about 0.25 to about 5 parts by weight per 100 parts by weight of said copolymer.

3. A modified resin composition as described in claim 2 except that the syrene-acrylonitrile copolymer contains from about 20 to about 35 percent acrylonitrile by weight and complementarily 80 to 65 percent styrene by weight.

4. A modified thermoplastic resin composition comprising: (A) a styrene-acrylonitrile copolymer containing from about 27 to about 29 percent by weight acrylonitrile and having an average molecular weight of about 180,000 to about 300,000, (B) a plasticizer in an amount of about 3 to about 7 parts by weight per 100 parts by weight of said copolymer, said plasticizer having the general formula $C_{2m-1}H_{4m-1}COOR''$ wherein R'' is a cyclohexyl radical and m has a value of from 6 to 8, and (C) a homogeneously dispersed wax in an amount of about 0.5 to about 3.0 parts by weight per 100 parts by weight of said copolymer.

5. A modified thermoplastic resin composition as described in claim 4 in which the wax constituent is carnauba wax.

6. A method for improving the impact strength and tensile elongation of a styrene-acrylonitrile copolymer which comprises the steps of adding to said copolymer: (A) about 1 to about 10 parts by weight per 100 parts by weight of said copolymer of a plasticizer having the general formula $R(COOR')_n$ wherein R' is a monovalent, saturated hydrocarbon radical containing from 4 to 10 carbon atoms and R is selected from the group consisting of an alkyl group containing from 11 to 17 carbon atoms, and a divalent, saturated aliphatic hydrocarbon radical containing from 4 to 8 carbon atoms with the provisos that when R is monovalent, n is 1, and that when R is divalent, n is 2, and (B) a wax in an amount of about 0.25 to about 5 parts by weight per 100 parts by weight of said copolymer; and in intimately mixing said copolymer, plasticizer, and wax constituents at a temperature of at least 165° C.

7. Method according to claim 6 in which the copolymer, plasticizer, and wax are mixed at a temperature of between 180° C. and 230° C.

8. Method according to claim 6, except that the plasticizer is added in an amount of from about 3 to about 7 parts by weight per 100 parts by weight of the styrene-acrylonitrile copolymer, said plasticizer having the general formula $C_{2m-1}H_{4m-1}COOR''$ wherein m has a value of from 6 to 9 and R'' is a cyclohexyl radical.

9. A method for improving the impact strength and tensile elongation of a styrene-acrylonitrile copolymer containing from about 20 to about 35 percent by weight acrylonitrile which comprises the steps of adding to 100 parts by weight of said copolymer (A) about 3 to about 7 parts by weight of a plasticizer having the general formula $C_{2m-1}H_{4m-1}COOR''$ wherein m has a value of from 6 to 8 and R'' is a cyclohexyl radical, and (B) a wax in an amount of from about 0.25 to 3.0 parts by weight, and intimately mixing said copolymer, plasticizer, and wax at a temperature of between 180° C. and 230° C.

10. A method according to claim 9 in which the styrene-acrylonitrile copolymer contains from about 27 to about 29 percent by weight of acrylonitrile and has an average molecular weight of about 180,000 to about 300,000.

References Cited in the file of this patent

UNITED STATES PATENTS

| | | |
|---|---|---|
| 2,209,246 | Bauer | July 23, 1940 |
| 2,861,046 | Stastny | Nov. 18, 1958 |